United States Patent
Guridi et al.

[11] Patent Number: 5,978,676
[45] Date of Patent: Nov. 2, 1999

[54] INBAND SIGNAL CONVERTER, AND ASSOCIATED METHOD, FOR A DIGITAL COMMUNICATION SYSTEM

[75] Inventors: Alberto Irizar Guridi, Durango; José Javier Jáñez González, Sopelana; Julio Salazar Orive, Bilbao, all of Spain

[73] Assignee: Telefonaktiebolaget L/M Ericsson (publ), Stokholm, Sweden

[21] Appl. No.: 08/749,825

[22] Filed: Nov. 15, 1996

[51] Int. Cl.⁶ .................................................. H04Q 7/38
[52] U.S. Cl. .................... 455/426; 455/553; 379/283; 379/386; 375/216
[58] Field of Search .................... 455/422, 426, 455/445, 553, 557; 375/216, 222; 379/386, 282, 283

[56] References Cited

U.S. PATENT DOCUMENTS

| | | | |
|---|---|---|---|
| 4,922,517 | 5/1990 | West, Jr. et al. | 455/426 |
| 5,119,397 | 6/1992 | Dahlin et al. | 375/216 |
| 5,295,178 | 3/1994 | Nickel et al. | 455/561 |
| 5,392,348 | 2/1995 | Park et al. | 379/386 |
| 5,544,227 | 8/1996 | Blust et al. | 455/426 |
| 5,745,523 | 4/1998 | Dent et al. | 375/216 |
| 5,778,024 | 7/1998 | McDonough | 375/216 |

FOREIGN PATENT DOCUMENTS

| | | |
|---|---|---|
| 0 547 373 A1 | 6/1993 | European Pat. Off. . |
| 0 534 852 A1 | 3/1993 | France . |
| 2 290 005 | 12/1995 | United Kingdom . |
| WO 95/06995 | 3/1995 | WIPO . |
| WO 96/32817 | 10/1996 | WIPO . |

*Primary Examiner*—Willis R. Wolfe
*Attorney, Agent, or Firm*—Jenkens & Gilchrist, P.C.

[57] ABSTRACT

Apparatus, and an associated method, for converting an inband signal, such as a DTMF signal, into a form to permit transmission thereof to a receive station. An inband signal, such as a DTMF signal generated by a wireline device is applied to a digital transmitter, such as a fixed cellular terminal having a digital transceiver. The inband signal is detected and encoded. The inband signal is encoded in a manner to permit its transmission according to an appropriate air interface standard.

21 Claims, 4 Drawing Sheets

INBAND SIGNAL CONVERTER, AND ASSOCIATED METHOD, FOR A DIGITAL COMMUNICATION SYSTEM

The present invention relates generally to the transmission of an inband signal, such as a DTMF (dual-tone, multifrequency) signal, from a sending station to a receiving station in a digital communication system. More particularly, the present invention relates to a converter apparatus, and an associated method, for converting the inband signal, input at the sending station, into a converted form to permit transmission of the converted signal to the receiving station. The inband signal is recreated, once received at the receiving station.

Use of an embodiment of the present invention permits, for example, DTMF signals entered by way of a conventional telephone, or other wireline device, coupled to a digital transceiver to be transmitted in converted form to a receiving station. The DTMF signal is thereafter recreated. A conventional telephone, or other wireline device, might be coupled to a digital transceiver in a household, or other location, at which conventional, wireline telephonic service is unavailable or inconvenient. When coupled to the digital transceiver, most normal telephonic communications by way of the telephone are permitted.

Vocoders used in some digital transceivers do not guarantee waveform integrity. For instance, when a DTMF signal is applied to such vocoders, accurate encoding of the DTMF signal to permit its later recreation cannot be guaranteed. Problems encountered with such vocoders are avoided when a digital transceiver, such as a digital cellular telephone, forms a standalone device. Codes are generated in substitution for DTMF signals. And, no DTMF signals are applied to the vocoder. When the codes are received at a receiving station, the codes are used to create the intended DTMF signals. However, when the digital transceiver is not a standalone device, but instead is coupled to receive signals generated by a wireline device, DTMF signals might be applied to the digital transceiver.

Operation of an embodiment of the present invention converts the DTMF signal generated at the conventional telephone, or other wireline device, into a form to permit its transmission by the digital transceiver.

BACKGROUND OF THE INVENTION

A communication system provides a manner by which information formed at a source location can be transferred to a destination location. To effectuate such transfer of information, a communication system is formed, at a minimum, by a sending station and a receiving station interconnected by a communication channel. The communication channel forms a communication link between the sending station and the receiving station. The sending station includes circuitry for converting the information which is to be communicated to the receiving station. Such circuitry forms a communication signal which is communicated upon the communication channel to the receiving station. And, the receiving station includes circuitry for receiving the communication signal transmitted by the sending station and for recovering the informational content thereof.

A wireline, telephone system is a type of communication system. PSTNs (Public Switched Telephone Networks) form the infrastructure of a wireline telephone system. Conventional telephones, or other wireline devices, are coupled to a PSTN by way of wireline connections. Both voice and data communications can be communicated by way of such a telephonic system. PSTNs have been installed throughout significant portions of the world. Telephonic communications effectuated therethrough are widely utilized.

A radio communication system is a communication system in which the communication link formed between the sending and receiving stations is formed of a portion of the electromagnetic frequency spectrum. A wireline connection is not required to form a communication channel interconnecting the sending and receiving stations. A radio communication system is therefore particularly advantageously utilized when a wireline connection between the sending and receiving stations is unavailable.

A cellular communication system is a type of radio communication system. Analogous to the telephonic communications permitted pursuant to a wireline telephonic system, telephonic communications are also permitted pursuant to a cellular communication system. The infrastructure of a cellular communication system is coupled to a PSTN. But, radio connections with mobile terminals obviate the need to install wireline connections to effectuate communications with such terminals.

The mobility permitted when communicating by way of a cellular communication system is much greater than that permitted when a wireline connection is required to effectuate communications. Due in part to the increased mobility of communications permitted by a cellular communication system, use of a cellular communication system to communicate telephonically has become increasingly popular.

Attempts have been made to increase the communication capacity of a cellular communication system. By increasing the communication capacity of a cellular communication system, increased numbers of users are permitted to communicate by way of such a system.

Some cellular communication systems have been implemented using digital technologies. In a digital communication system, the information which is to be communicated is digitized. Once the information is digitized, a communication signal formed therefrom can be transmitted in a bit stream. Two or more communication signals can be thereby multiplexed together by way of a selected, access technique. For instance, time-division-multiple-access (TDMA) communication systems utilize sequential multiplexing of bursts upon a carrier. The bursts are transmitted during selected time slots of frames formed of a plurality of time slots.

The GSM (Global System for Mobile communications) cellular communication system is exemplary of a digital cellular communication system. GSM communication systems have been installed throughout significant areas in which cellular communications are provided.

As noted above, cellular communication systems are popular in many instances due to the increased mobility of communications permitted therein. In some areas, also, access to conventional, wireline telephonic service is unavailable or limited. The costs associated with installing the wireline infrastructure required of conventional wireline systems are significant. In areas in which such wireline infrastructure has not already been installed, the installation instead of a cellular communication system is a cost-effective alternative.

Therefore, in areas in which the existing infrastructure of conventional wireline systems have not already been installed, it is anticipated that installation of cellular communication systems shall instead be made. Telephonic communication shall, in such instance, be effectuated by way of a cellular communication system.

Most simply, a cellular transceiver can be used to effectuate the telephonic communications. However, many communication devices are constructed for connection to a conventional, wireline system. Connection of such communication devices to a cellular transceiver permits such communication devices to be continued to be used even when a wireline system is otherwise unavailable.

Fixed cellular terminals have been developed which permit the connection thereto of one or more communication devices. Conventional, wireline telephones are exemplary of such communication devices. Normal telephonic communication is permitted of a user utilizing the conventional telephone. Communication signals provided to the fixed cellular terminal from the conventional telephone are transmitted by the fixed cellular terminal to the cellular network infrastructure of the cellular communication system. Downlink signals transmitted from the cellular network to the fixed cellular terminal are, in turn, provided to the conventional telephone.

Most normal, telephonic communications are permitted by way of a fixed cellular terminal. However, when the fixed cellular terminal is a digital cellular transceiver, such as a GSM cellular transceiver, DTMF signals generated at the conventional, wireline telephone are not necessarily accurately communicated by way of the cellular transceiver. DTMF signals are generated by a user of the conventional, wireline telephone when carrying out any of many telephonic functions. Generation of the DTMF signals are required, for instance, to gain entry into, and to make use of, many automated telephone services.

In a digital transceiver, an input speech signal is encoded using a vocoder. The vocoder used in a GSM cellular transceiver, for instance, does not guarantee waveform integrity of a signal applied thereto. As a result, accurate encoding of a DTMF signal in a manner to accurately ensure its subsequent recreation cannot be guaranteed.

When a GSM cellular transceiver, or other digital transceiver, forms a standalone device, actuation of a telephonic key actually causes the generation of a code instead of a DTMF signal. The code is transmitted to, and received at, the cellular network. A DTMF signal is created responsive to the received code. Thereby, problems associated with the inability of the vocoder to encode accurately a DTMF signal are avoided. However, when the transceiver is coupled to a separate wireline telephone, or other wireline device, DTMF signals are applied as inputs to the GSM cellular, or other digital, transceiver.

A manner by which a DTMF signal generated by a conventional, wireline telephone, or other device, could be converted into a form to permit the digital cellular transceiver to communicate accurately an indication of the DTMF signal would therefore be advantageous. Use of a fixed cellular terminal to effectuate telephonic communications would thereby more closely resemble that of a conventional, wireline telephonic network.

More generally, a manner by which to convert an inband signal into a form to permit a digital transmitter to communicate accurately an indication of the inband signal would be advantageous. An inband signal is a signal which is transmitted within a channel upon which a signal of another signal-type is transmitted.

It is in light of this background information related to telephonic communications that the significant improvements of the present invention have resulted.

SUMMARY OF THE INVENTION

The present invention advantageously provides apparatus, and an associated method, for converting an inband signal input at a sending station into a form to permit transmission of the converted signal to a receiving station. Once received at the receiving station, the inband signal is recreated.

In one aspect of the present invention, the inband signal forms a DTMF signal transmitted on an audio channel of a conventional telephone, or other wireline device. Interface apparatus is positioned to form an interface between the conventional telephone, or other wireline device, and a digital transceiver. The DTMF signal is converted by the interface apparatus into a form to permit its transmission to a receiving station. The DTMF signal is thereafter recreated at the receiving station. The sending station includes, for example, a digital transceiver to which the conventional telephone, or other wireline device, is coupled.

In another aspect of the present invention, a fixed cellular terminal includes apparatus which converts DTMF signals applied thereto into forms which can be accurately interpreted and transmitted by a digital transceiver forming a portion of the fixed cellular terminal. The fixed cellular terminal is, for example, utilized at a fixed location, such as a household or business location, at which conventional, wireline, telephonic service is unavailable.

The DTMF signals are generated, for instance, by a conventional POTS (Plain Old Telephone Service) telephone coupled to the fixed cellular terminal. The DTMF signals are generated, for example, by the actuation of the telephonic keys of the telephonic key pad of the conventional telephone.

When the fixed cellular terminal includes a digital transceiver unit operable in a GSM communication system, the DTMF signal is converted in a manner corresponding to the DTMF signal-coding scheme defined in the GSM standard specification. Other standard or proprietary coding schemes can, analogously, be utilized.

Through operation of an embodiment of the present invention, an end telephone user utilizing a POTS telephone is able to signal DTMF information during a telephone conversation, using the same procedure which is standard in a normal, fixed telephone network.

In these and other aspects, therefore, apparatus, and an associated method, converts an inband signal into a form to permit transmission thereof to a receive station. The apparatus is operable, for example, in conjunction with a sending station operable in a digital communication system to transmit signals to the receive station. The sending station is coupled to receive a general input signal, and the general input signal is selectively formed of an inband signal. An inband signal detector is coupled to receive indications of the general input signal. The inband signal detector detects when the general input signal forms an inband signal and determines values of the inband signal when received thereat. An encoder is coupled to receive indications of the values of the inband signal detected by the inband signal detector. The encoder forms an encoded signal. The encoded signal is encoded responsive to the values of the inband signal and is of the form to permit transmission thereof to the receive station.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
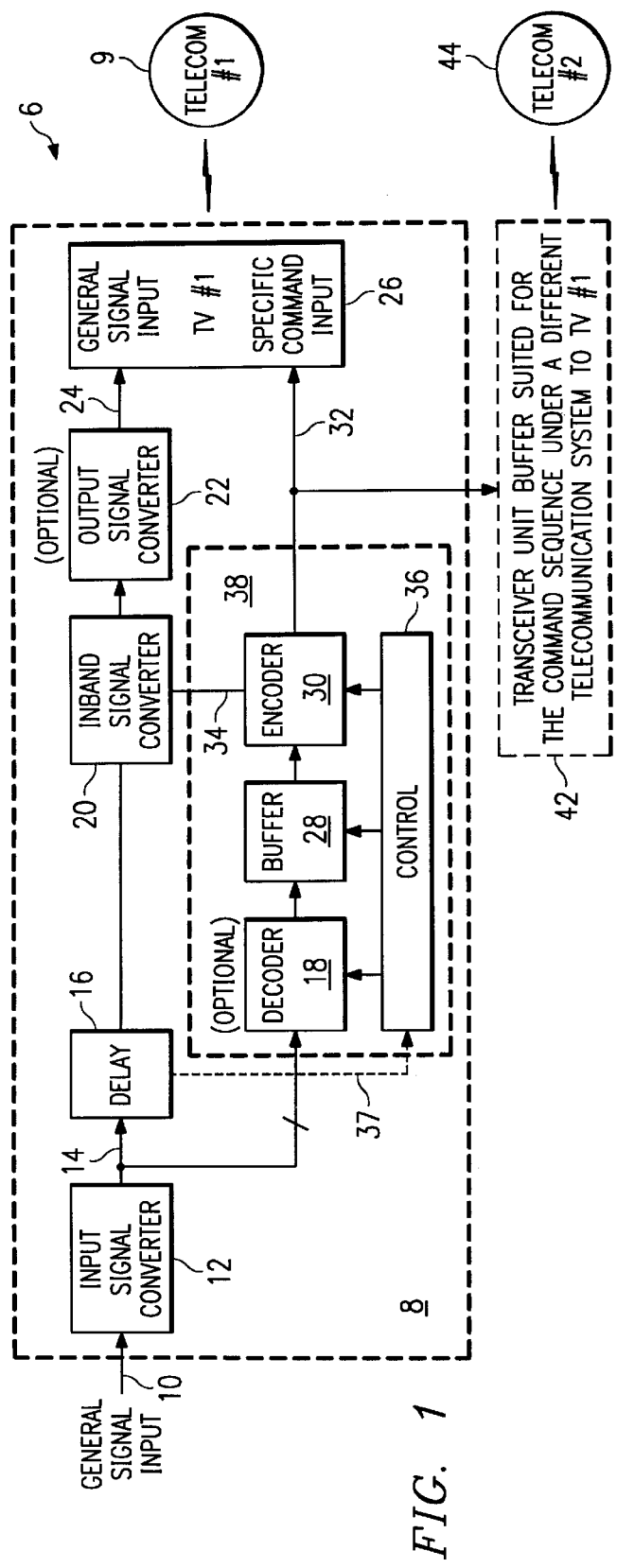
FIG. 1 illustrates a functional block diagram of a communication system in which an embodiment of the present invention is operable.

Referring first to FIG. 1, a communication system, shown generally at 6, permits communication at least between a sending station 8 and a telecommunications network 9. A general signal is applied to the sending station 8 on line 10. The general signal may include an inband signal as a portion thereof.

The general signal generated on line 10 is applied, in the exemplary embodiment, to an input signal converter 12, such as an analog-to-digital converter. The converter generates a converted signal on line 14 which is applied to a delay element 16 and to a decoder 18. The delay element 16 is selectively coupled, by way of an inband signal converter 20, to, in the exemplary embodiment, an output signal converter 22, such as a digital-to-analog converter. The output signal converter is coupled by way of line 24 to a general signal input port of a transmitter 26.

The decoder 18 decodes the converted signal applied thereto, and the decoded signal is applied to a buffer 28 to be stored thereat. Indications of the buffered signal stored at the buffer 28 are selectively applied to an encoder 30 to be encoded thereat. In one embodiment, the encoded signal forms a logic signal. When an encoded signal encoded by the encoder 30 is generated, the encoded signal is applied, by way of line 32 to a specific command input port of the transmitter 26. The encoder also selectively generates a signal on line 34 which controls positioning of the inband signal converter 20.

A control element 36 is coupled to the decoder 18, buffer 28, and encoder 30 to control operation thereof. In the illustrated embodiment, the decoder 18, buffer 28, encoder 30, and control element 36 together form functional portions of an inband signal processor 38. In another embodiment, and as indicated by the line 37, shown in dash, the control element is further coupled to the delay element 16.

During operation of the sending station 8, general signals are applied thereto on line 10. Such signals are converted by the converter 12, and converted signals are applied by way of line 14 to the decoder 18. The decoder decodes the converted signals, and indications of sequences of such decoded signals are stored in the buffer 28. The control element 36 analyzes the stored sequences. When the element determines the delayed signal to include an inband signal, the controller causes operation of the encoder 30 to encode the buffered signal. The inband signal converter 20 is caused to convert the signal delayed by the delay element applied thereto into a form in which the inband signal is not evident, or is otherwise converted. The encoded signal is applied to the specific command input of the transmitter 26.

When, conversely, the control element 36 determines the signal sequence stored in the buffer applied thereto not to include an inband signal, the inband signal converter 20 does not convert the delayed signal applied thereto by way of the delay element 16 into a new form, but merely applies the delayed signal to the general signal input of the transmitter 26. And, the encoder does not provide an encoded signal to the specific command input of the transmitter 26.

In an embodiment in which the control element 36 is further coupled to the delay element 16, the control element 36 is operable responsive to indications provided by the delay element 16 that a certain, selected amount of signal is delayed thereat. Responsive to reception of such indication, the control element 36 determines whether the inband signal forms a portion of the signal sequence buffered by the buffer 28. If so, the control element causes operation of the encoder 30 in manners described previously.

In another embodiment, an additional transmitter, here transmitter 42, shown in dash, is instead coupled to the line 32 to receive the encoded signal selectively generated by the encoder 30. The transmitter 42 is used in an embodiment in which the transmitter forms a transmitter 42 better suited for transmitting a command sequence formed of the signal generated on line 32 to a separate telecommunications network, here telecommunications network 44.

Figure 2:
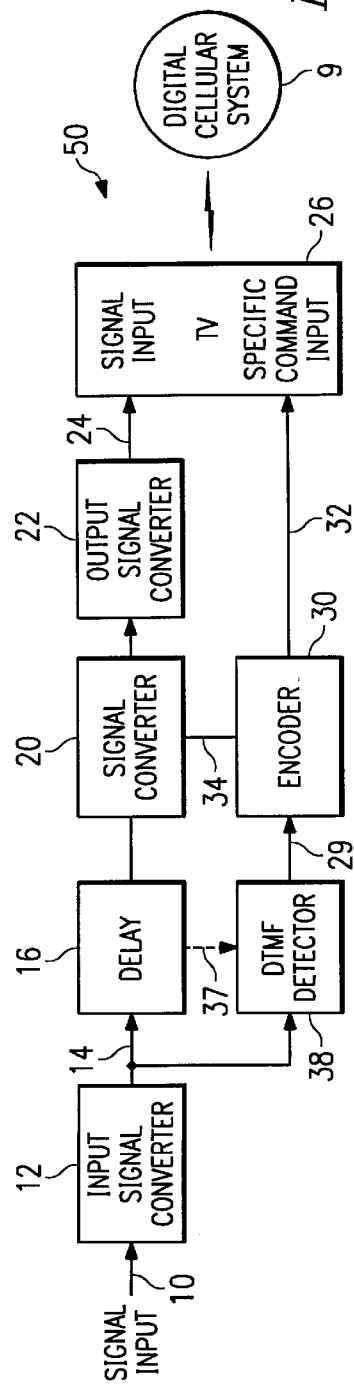
FIG. 2 illustrates another functional block diagram of a communication system in which an embodiment of the present invention is operable.

Referring next to FIG. 2, a communication system, shown generally at 50, permits communication between a sending station 8 and a telecommunications network 9. A general signal is applied to the sending station 8 on line 10. The general signal at least selectively includes a DTMF signal as a portion thereof.

The general signal generated on line 10 is applied, in the exemplary embodiment, to an input signal converter 12, such as an analog-to-digital converter. The converter generates a converted signal on line 14 which is applied to a delay element 16 and to a DTMF detector 38. In one embodiment, the DTMF detector is also coupled, by way of line 37, shown in dash in the figure, to the delay element 16.

The delay element is selectively coupled, by way of an audio signal converter 20, to an output signal converter, such as a digital-to-analog converter. The output signal converter is coupled by way of line 24 to a general signal input port of a transmitter 26.

The DTMF detector 38 detects when the converted input signal includes a DTMF tone. In one embodiment, the DTMF detector detects the presence of the DTMF tone in the signal generated on line 14. In an embodiment in which the detector 38 is coupled to the delay element 16, the detector is operable responsive to reception thereat of indications of a certain amount of signal delay by the delay element 16. For instance, the certain amount of signal delay corresponds, in one embodiment, to a time period required by the detector 38 to detect a DTMF tone. When the DTMF detector detects the presence of a DTMF tone, an indication of the detected DTMF tone is applied, by way of line 29, to an encoder 30. The encoder 30 is operable to encode the signal applied thereto and to generate an encoded signal on line 32 which is applied to a specific command input of the transmitter 26. The encoder is further operable to generate a signal on line 34 to cause operation of the audio signal converter 20 when the DTMF detector detects the presence of a DTMF tone. The audio signal converter 20 converts the delayed signal into a form which does not include the DTMF tone.

During operation of the sending station, when a DTMF tone is detected to form a portion of the general signal, an encoded signal is generated and is applied to the transmitter 26 in substitution for the DTMF signal.

When, conversely, the DTMF detector 38 does not detect the presence of a DTMF tone, indications are not provided to the encoder 30, the encoder 30 does not encode the signal, and the audio signal converter merely passes the signal applied thereto. Thereby, the general signal is applied to the signal input of the transmitter 26. The delay element 16 introduces a delay into the general signal so that the DTMF detector is able to detect the presence of the DTMF signal in the general signal and to allow the converter 20 to alter the inband signal so that it is not transmitted by the transceiver. Viz., the delay element is used so that the DTMF signal can be detected, and actions can be taken in consequence thereto.

Figure 3:
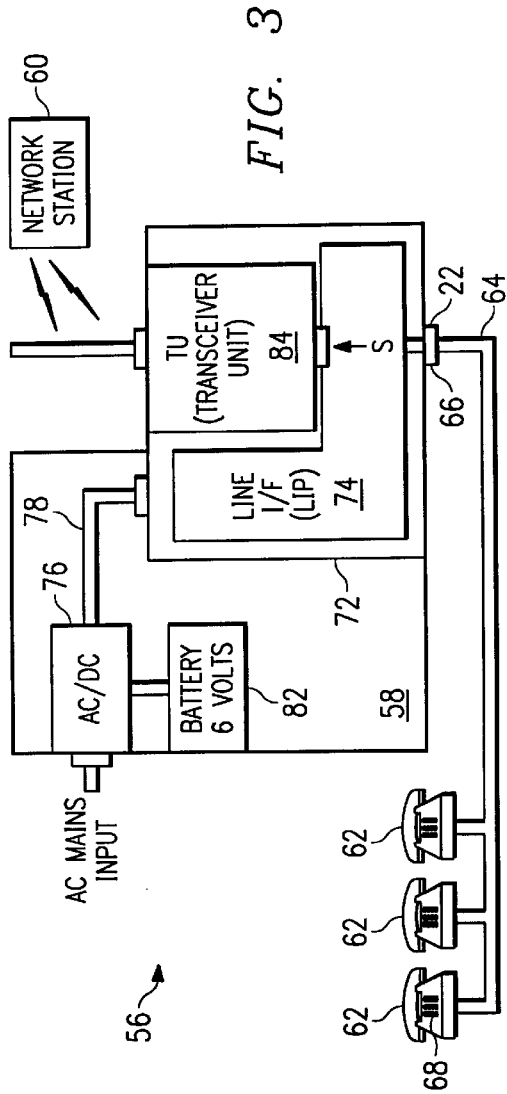
FIG. 3 illustrates a functional block diagram of a communication system having a fixed cellular terminal in which an embodiment of the present invention is operable.

Referring next to FIG. 3, a digital communication system, shown generally at 56, permits the communication of information between a fixed cellular terminal 58 and a network station 60 of a cellular network. It should be noted that, while the exemplary embodiment shown in FIG. 3 is described with respect to a cellular communication system, the teachings of the present invention can analogously be embodied in another type of digital communication system with appropriate modifications, as appropriate.

The fixed cellular terminal 58 forms a fixed station to which a selected number, here three, of POTS (Plain Old Telephone Service) telephones 62 are connected. The POTS telephones 62 are connected to the terminal 58 by way of lines 64 and connectors 66. Here, the connectors 66 are formed of multi-pin connectors. In one embodiment, the connectors 66 are plugged-in to corresponding receptacles. The corresponding receptacles are, in turn, coupled to the fixed cellular terminal 58 by way of wired connections (not shown in the Figure). The wired connections permit the telephones 62 to be positioned at locations spaced-away from the terminal 58.

The POTS telephones 62 are operable in conventional manner to send and to receive voice signals and also to generate tones which form DTMF signals. In conventional manner, DTMF signals are generated at the telephones 62 by actuation of selected telephonic keys of the telephonic key pads 68 of the telephones 62.

The connectors 66 couple the lines 64 to a single line module (SLM) 72. The SLM 72 forms a portion of the fixed cellular terminal 58. The SLM 72 includes a line interface part 74 as a portion thereof.

The SLM 72 is connected to a power supply 76 by way of lines 78. The power supply 76 is provided with operative power generated at an alternating-current power source (not shown) provided to the power supply 76. As illustrated, the power supply 76 forms an alternating-current to direct-current converter. A battery backup 82 forms a backup power source for power in the fixed cellular terminal 58.

The fixed cellular terminal 58 further includes a digital transceiver unit 84. The digital transceiver unit is coupled to the line-interface part 74 of the SLM 72. In the exemplary embodiment, the transceiver unit 84 is formed of a cellular transceiver operable in a GSM (Global System for Mobile communications) communication system.

A digital transceiver typically includes coding circuitry, sometimes referred to as a vocoder. The coding circuitry encodes the signals applied thereto according to a selected encoding scheme. In the vocoder utilized in a conventional, GSM transceiver, the vocoder is operated in a manner which does not guarantee waveform integrity. Such a vocoder is intended primarily for speech transmission. As noted previously, such a vocoder is sometimes unable to correctly code a DTMF signal applied thereto. Hence, when a digital transceiver is utilized, the correct transmission of DTMF signals generated during speech transmission cannot be guaranteed.

The fixed cellular terminal 58 is utilized, for instance, to provide a household or a business location with access to telephonic communications even if the location is not accessible to conventional wireline, telephonic services. A user of a telephone 62 utilizes such phone in conventional manner to communicate telephonically. Voice signals generated by the user and DTMF signals generated when the user actuates a key of the telephonic key pad 68 of the telephone are applied, by way of lines 64, to the line interface part 74 of the SLM 72.

The line interface part 74 includes circuitry which detects the generation of a DTMF signal on the lines 64. When the input signal applied to such circuitry by way of the lines 64 is detected to include a DTMF signal, the DTMF signal is encoded to form, e.g., a logical signal. The encoded signal is applied to the transceiver unit 84, and a signal representative thereof is transmitted. In an embodiment in which the transceiver unit 84 forms a cellular transceiver operable in a GSM communication system, the encoded signal is encoded in a manner which when applied to the transceiver unit 84, permits a signal formed pursuant to a standard coding scheme set forth in a standard specification for GSM communication systems to be formed. In such an embodiment, the cellular transceiver is thereby operable to transmit the coded signal upon a control channel in a manner defined in the standard specification for GSM communications.

When the input signals applied by way of lines 64 to such circuitry do not include DTMF signals, the signals are applied directly to the transceiver unit 84 to be transmitted therefrom to the network station 60. In an embodiment in which the transceiver unit 84 forms a cellular transceiver operable in a GSM communication system, the cellular transceiver is operable to transmit the signal upon a traffic channel according to the protocols and procedures set forth in the standard specification for GSM.

Figure 4:
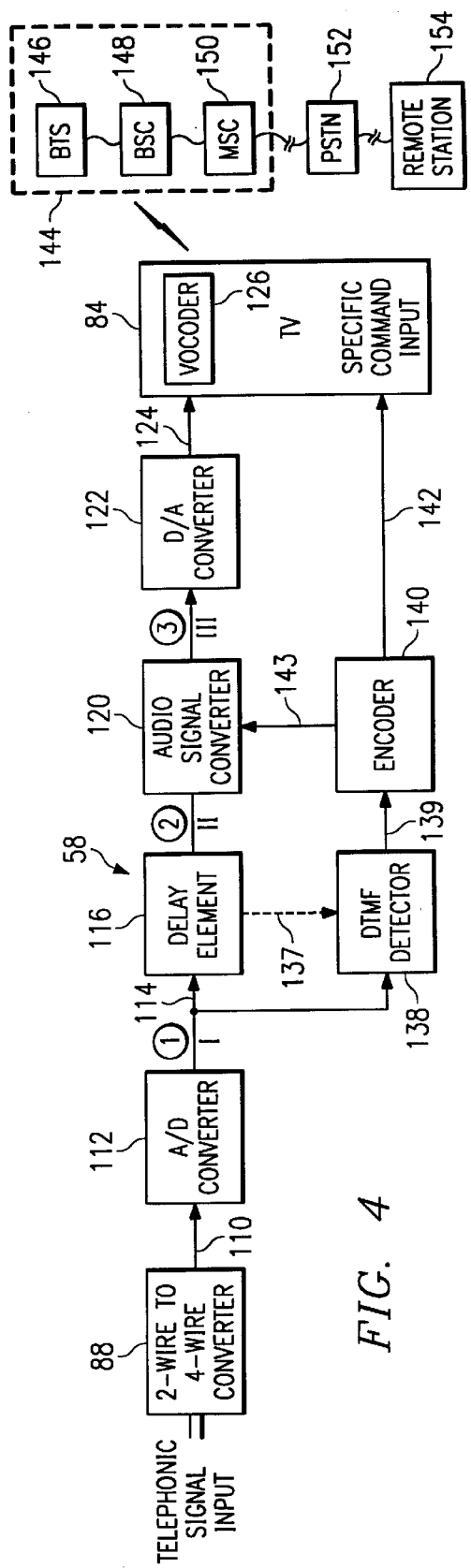
FIG. 4 illustrates a functional block diagram of a portion of the fixed cellular terminal shown in FIG. 3.

FIG. 4 illustrates a portion of the fixed cellular terminal 58 of FIG. 3 in greater detail. The illustrated portion of the terminal includes the circuitry which detects when portions of input signals applied to the fixed cellular terminal form DTMF signals. Operation of the circuitry encodes the detected DTMF signals. Once encoded, the signals are provided to a cellular transceiver to be transmitted to a network station whereat the DTMF signal is recreated.

Input signals generated during operation of a telephone 62 (shown in FIG. 3) are applied to a two-wire to four-wire converter 88. The converter 88 converts a signal generated according to the standard two-wire interface conventional of a POTS telephone into a four-wire signal.

The converted signal generated by the converter 88 is applied by way of lines 110 to an analog-to-digital converter 112. The converter 112 is operable to convert the analog signals applied thereto on the lines 112 into digital form and to generate a digitized signal on line 114.

Sequences of the digitized signal generated on the line 114 are stored in a delay element 116. In one embodiment, forty millisecond sequences of the digitized signal are stored in the delay element. The sequences delayed by the delay element are provided by way of an audio signal converter 120 to a digital-to-analog converter 122. The converter 122 converts the signals applied thereto into analog form on line 124. Line 124 is coupled to an audio input of the transceiver unit 84. A vocoder 126, internal to the transceiver unit 84, is coupled to receive indications of the signal generated on line 124. (While not separately shown, the signal generated on line 124 is, e.g., first digitized by a digitizer.)

In one embodiment, the delay element 116 is further coupled by way of line 137, shown in dash, to a DTMF detector 138.

The DTMF detector 138 is coupled to receive the digitized signal generated by the converter 112 on line 114.

The DTMF detector 138 is operable to detect when the sequences of the digitized signal form a DTMF signal. In the embodiment in which the delay element is coupled to the detector 138, the detector determines the presence of the DTMF tone when a certain amount of signal is delayed by the delay element 116.

The DTMF detector 138 detects whether a sequence of the digitized signal forms a DTMF signal and determines the tonal frequencies of the DTMF signal, if detected. Indications of detected DTMF tones are provided by the detector 138 by way of line 139 to an encoder 140. The encoder 140 is operable to form an encoded signal on line 142 of a coded value, such as a logic signal. The coded value of the encoded signal formed by the encoder is selected responsive to the determined value of the DTMF signal.

The encoded signal generated by the encoder on line 142 is applied to a specific command input of the transceiver unit 84. When the detector 138 determines the sequence of the digitized signal to be formed of a DTMF signal, a signal is also generated by the encoder 140 on line 143 to indicate such detection. Line 143 is coupled to the audio signal converter 120. The converter is operable to convert sequences of the digitized signal delayed by the delay element 116, and applied to the converter, to be converted into converted form. In one embodiment, the converter 120 converts the sequence forming the DTMF signal into a "silent" sequence. That is to say, the bits corresponding to the DTMF signal are converted into bits which correspond to silence. In other embodiments, other sequences are formed. For instance, a sequence corresponding to a telephonic key click might be generated. The sequences into which the converter 120 converts the signal are applied to the digital-to-analog converter 122 and then to the audio signal input of the transceiver 84.

When the DTMF detector 138 determines the sequence not to be formed of a DTMF signal, the audio signal converter 120 merely passes the delayed sequence to the d/a converter 122.

Thereby, the transceiver unit 84 receives an encoded signal on line 142 when the sequence of the digitized signal applied to the DTMF detector is formed of a DTMF signal and receives the sequence of the digitized signal in line 124 (when the sequence is an other-than-DTMF signal). Such digitized signal is modified by a silence indication if the DTMF tone is detected to be present.

In an embodiment in which the transceiver unit 84 forms a cellular transceiver operable in a GSM communication system, the encoded signals generated by the encoder form logic signals which are used by the transceiver to form signals corresponding to the encoding scheme set forth in the European Digital Cellular Telecommunications System (phase two) standard specification relating to the support of dual tone multi-frequency signaling via the GSM system (GSM 03.14). Such signals generated by the transceiver are transmitted on a control or signaling channel in manners also set forth in the standard specification for GSM. The signals generated on line 124 and applied to the cellular transceiver 84 are transmitted upon a traffic channel, in conventional manner, pursuant to the GSM standard specification.

Portions of the cellular network 144 are also shown in FIG. 4. The cellular network 144 includes a base transceiver station (BTS) 146, a base station controller (BSC) 148, and a mobile services switching center (MSC) 150. The base transceiver station 146 receives signals transmitted by the transceiver unit 84. Indications of such received signals are provided to the base station controller 148 and, in turn, to the MSC 150. The MSC 150 is operable to recreate the digital signal responsive to transmission by the transceiver unit 84 of the appropriate coded signal upon the control channel. Once the DTMF signal is recreated, the signal is forwarded, e.g., to a public switched telephone network (PSTN) 152, thereafter to be forwarded to a remote station 154, as appropriate.

Figure 5:
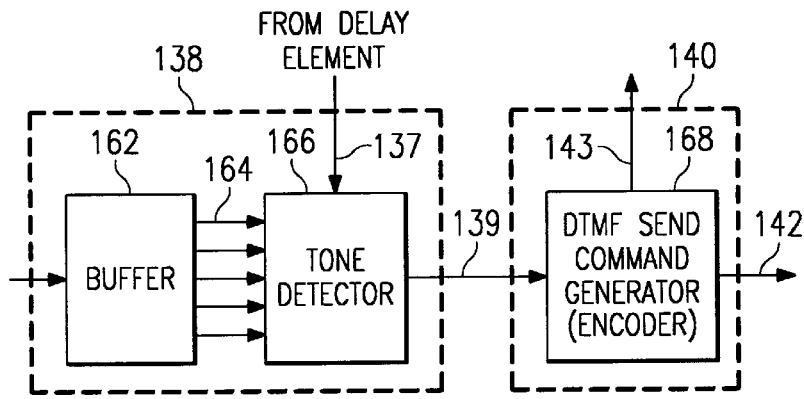
FIG. 5 illustrates a functional block diagram of portions of the apparatus forming a portion of an embodiment of the present invention shown in FIG. 4 and of network apparatus which receives and recreates a DTMF signal.

FIG. 5 illustrates portions of the DTMF detector 138 and encoder 140 of an exemplary embodiment. The digitized signal generated on line 114 is applied to a buffer 162. The buffer stores sequences of the signal applied thereto. The sequences of the signal stored at the buffer 162 are applied by way of lines 164 to a tone detector 166.

The tone detector detects tones forming portions of the signal applied thereto. In one embodiment, the tone detector detects DTMF tones defined in ITU-T Recommendation Q-23, Telecommunication Standardization Sector of the ITU. Indications of the tones detected by the tone detector are provided by way of line 139 to a DTMF send command generator and encoder 168 of which the encoder 140 is formed. The generator and encoder is operable to generate encoded signals on line 142, as described previously, to generate signals on line 143, as also described previously.

In an embodiment in which the DTMF detector is provided, by way of line 137, indications that the delay element has delayed at least a certain amount of the signal applied thereto, the tone detector 166 is operable, in manners described above, responsive to such indications.

In the exemplary embodiment, the functions of the detector 138 and encoder 140 are provided by algorithms executable in a processing device.

Figure 6:
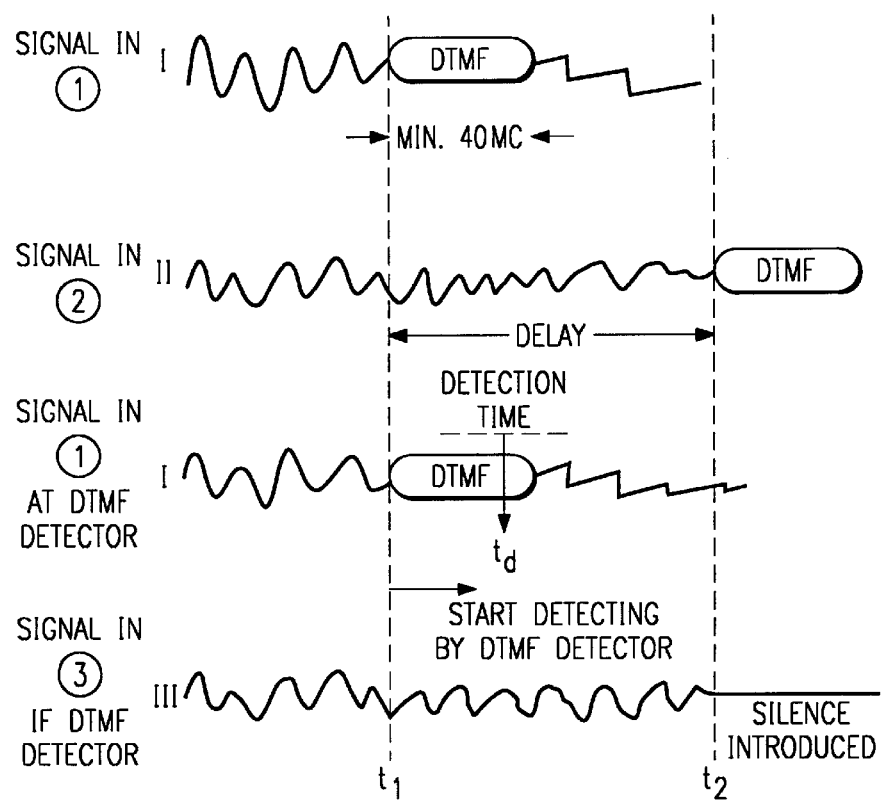
FIG. 6 illustrates timing diagrams showing operation of a portion of an embodiment of the present invention.

FIG. 6 illustrates timing diagrams extending between times $t_1$ and $t_2$ showing an operation of portions of the circuitry shown in FIG. 4. The top timing diagram illustrates application of a DTMF signal to the delay element 116 at I. The designation of I is also shown in FIG. 4, to represent application of the DTMF signal to the delay element. The DTMF signal is shown to be of a duration of at least forty milliseconds.

The delay element 116 is operable to delay the DTMF signal for a selected delay period, here the delay period of $(t_2-t_1)$. A delayed signal is generated at II, represented by the second timing diagram. The designation of II is also shown in FIG. 4 to represent generation of the delayed DTMF signal by the delay element.

The third timing diagram represents application of the DTMF signal to the DTMF detector 138 at the same time at which the signal is applied to the delay element 116. The DTMF detector 138 requires a detection time period, td, to detect the DTMF signal.

When the DTMF detector detects the presence of the DTMF signal, the converter 120 is caused to substitute a signal, here a "silent" signal indicated at III. The designation of III is also shown in FIG. 4 to represent substitution by the element 120 of the DTMF signal with the silent signal. The silent signal is generated for a period of time at least corresponding to the estimated duration of the DTMF signal, detected by the tone detector.

Figure 7:
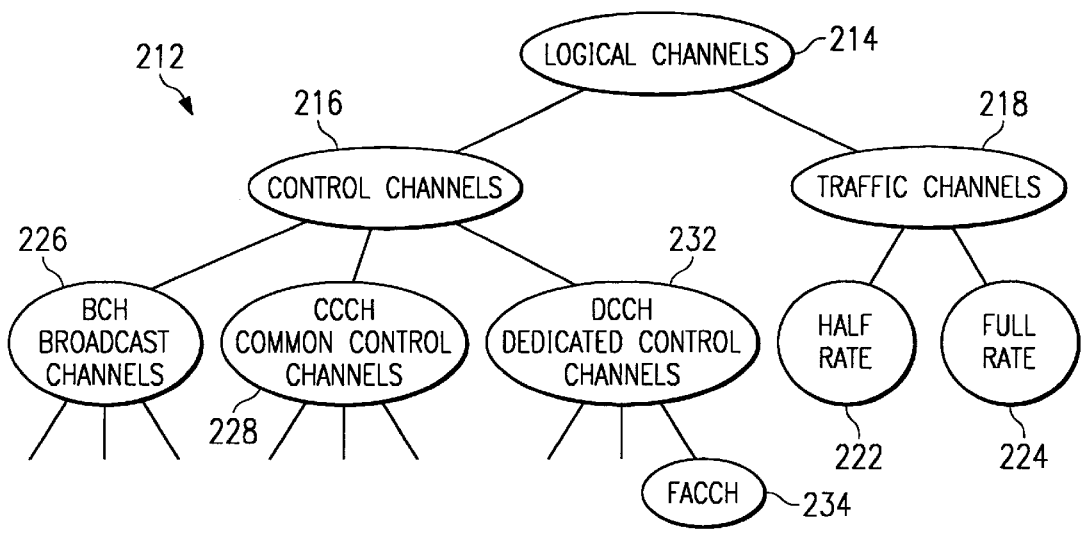
FIG. 7 illustrates selected channels defined in an exemplary channel scheme, here the channel scheme defined in a GSM cellular communication system.

FIG. 7 illustrates selected channels of the channel scheme, shown generally at 212, defined in a GSM communication system. As described above, an embodiment of the present invention is operable in such a communication system. The channel scheme defines logical channels 214. The logical channels 214 include control channels 216 and traffic channels 218. The traffic channels 218 form half rate channels 222 and full rate channels 224. And the control channels 216 include broadcast channels (BCHS) 226, common control channels (CCCHs) 228 and dedicated control channels (DCCHS) 232. The broadcast, common control, and dedicated control channels 226, 228, and 232 include various control channels, all defined pursuant to the GSM standard specification.

The dedicated control channel 232 is shown to include a fast associated control channel (FACCH) 234. In an embodiment of the present invention in which the transceiver unit 84 forms a GSM cellular transceiver, the coded signal formed by the encoder 140 is transmitted by the transceiver 84 upon the FACCH 234. Other-than-DTMF signals, such as voice signals, and sequences which are converted by, e.g., an audio speech converter 120 (shown in FIG. 4) applied to the transceiver unit 84 are transmitted by the transceiver unit upon selected traffic channels 218.

Figure 8:
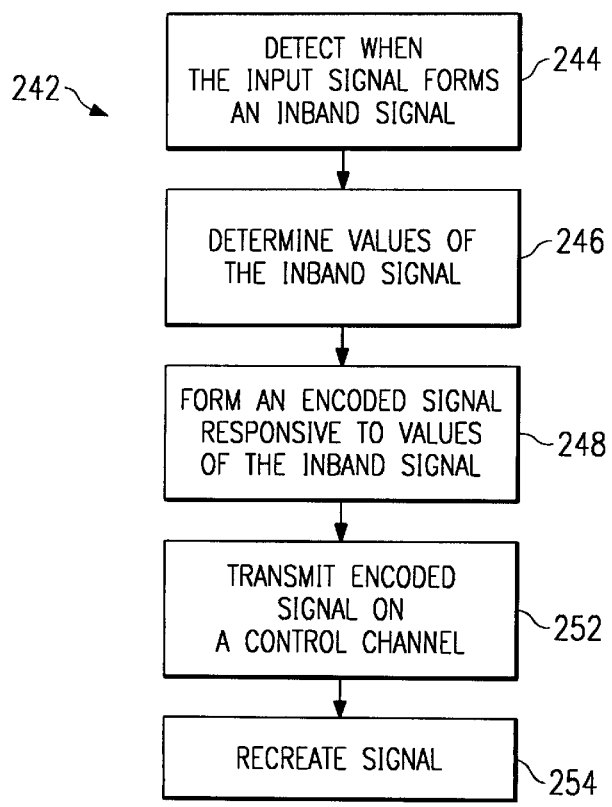
FIG. 8 illustrates a logical flow diagram listing the method steps of the method of an embodiment of the present invention.

FIG. 8 illustrates a method, shown generally at 242, which lists the method steps of an embodiment of the present invention. The method is operable at least to convert an inband signal into a form to permit transmission thereof to a receive station. First, and as indicated by the block 244, detection is made of when an input signal includes an inband signal. Then, as indicated by the block 246, values of the inband signal are determined.

An encoded signal is then formed, as indicated by the block 248, responsive to the values of the inband signal. Then, the encoded signal is transmitted. As indicated in the block 252, when the method is operable in a GSM communication system, the encoded signal is transmitted upon a control channel. Once received at a receive station, and as indicated by the block 254, the inband signal is recreated from the encoded signal. Again, in an embodiment in which the method is operable in a GSM communication system, the inband signal is recreated at an MSC, such as the MSC shown in FIG. 4.

Because operation of an embodiment of the present invention converts an inband signal, such as a DTMF signal, into a form to permit its transmission by a digital transceiver, inband signals, such as the DTMF signals generated by a conventional telephone, or other wireline device, can be applied to a digital transceiver to be transmitted therefrom. When the transmitted signal is thereafter received at a receiving station, the inband signal is recreated. When embodied in a fixed cellular terminal, a conventional wireline device can be coupled thereto. And, both inband signals and other-than-inband signals generated at the conventional wireline device can be accurately transmitted from the fixed cellular terminal.

The previous descriptions are of preferred examples for implementing the invention, and the scope of the invention should not necessarily be limited by this description. The scope of the present invention is defined by the following claims.

What is claimed is:

1. In a sending station operable in a digital communication system to transmit send signals to a receive station, the sending station coupled to receive a general input signal, the general input signal selectably formed of an inband signal, an improvement of apparatus for converting the inband signal into a form to permit transmission of an indication of the inband signal to the receive station, said apparatus comprising:

an inband signal detector coupled to receive the general input signal, said inband signal detector for detecting when the general input signal includes a selected inband signal and for determining values of the inband signal when received thereat;

an encoder coupled to receive indications of the values of the inband signal detected by said inband signal detector, said encoder for forming an encoded signal, the encoded signal encoded responsive to the values of the inband signal, the encoded signal of the form to permit transmission of the indication of the inband signal to the receive station; and a signal delay element coupled to receive said inband signal, said signal delay element for storing at least a segment of said input signal for a selected time period.

2. The apparatus of claim 1 wherein the inband signal comprises a DTMF (dual-tone, multi-frequency) signal and wherein said inband signal detector comprises a DTMF detector for detecting when the general input signal includes a DTMF signal.

3. The apparatus of claim 2 wherein said apparatus further comprises an analog-to-digital converter coupled to receive the DTMF signal, said analog-to-digital converter for digitizing the DTMF signal into digital form, and wherein said DTMF detector is coupled to receive the DTMF signal digitized by said analog-to-digital converter.

4. The apparatus of claim 1, wherein the inband signal is a DTMF signal.

5. The apparatus of claim 1 further comprising transmitter circuitry coupled to said encoder, said transmitter circuitry for generating and transmitting the send signal, the send signal representative of the encoded signal when the input signal is formed of the inband signal.

6. In a sending station operable in a digital communication system to transmit send signals to a receive station, the sending station coupled to receive a general input signal, the general input signal selectably formed of an inband signal, an improvement of apparatus for converting the inband signal into a form to permit transmission of an indication of the inband signal to the receive station, said apparatus comprising:

an inband signal detector coupled to receive the general input signal, said inband signal detector for detecting when the general input signal includes a selected inband signal and for determining values of the inband signal when received thereat;

an encoder coupled to receive indications of the values of the inband signal detected by said inband signal detector, said encoder for forming an encoded signal, the encoded signal encoded responsive to the values of the inband signal, the encoded signal of the form to permit transmission of the indication of the inband signal to the receive station;

transmitter circuitry coupled to said encoder, said transmitter circuitry for generating and transmitting the send signal, the send signal representative of the encoded signal when the input signal is formed of the inband signal; and wherein the send signal, when the input signal is formed of the inband signal, comprises a first component portion which is transmitted by said transmitter circuitry upon a non-traffic channel, the non-traffic channel defined in the digital communication system.

7. The apparatus of claim 6 wherein the send signal further comprises a second component portion and wherein said apparatus further comprises an inband signal converter coupled to receive indications of the inband signal, said inband signal converter for converting the indications of the inband signal into a converted-form signal, the converted-form signal forming the second component portion, the second component portion transmitted by said transmitter circuitry upon a traffic channel, the traffic channel defined in the digital communication system.

8. The apparatus of claim 6 wherein the digital communication system comprises a digital cellular communication system and wherein said transmitter circuitry comprises a cellular transceiver operable in the digital cellular communication system.

9. The apparatus of claim 8 wherein the inband signal comprises a DTMF tone and wherein said inband signal detector comprises a DTMF detector.

10. The apparatus of claim 9 wherein said inband signal detector and said encoder are embodied in a processor having algorithms executable therein.

11. The apparatus of claim 10 wherein said transmitter circuitry selectively generates and transmits the send signal upon at least a selected one of a traffic channel and a non-traffic channel.

12. In a sending station operable in a digital communication system to transmit send signals to a receive station, the sending station coupled to receive a general input signal, the general input signal selectably formed of an inband signal, an improvement of apparatus for converting the inband signal into a form to permit transmission of an indication of the inband signal to the receive station, said apparatus comprising:

an inband signal detector coupled to receive the general input signal, said inband signal detector for detecting when the general input signal includes a selected inband signal and for determining values of the inband signal when received thereat;

an encoder coupled to receive indications of the values of the inband signal detected by said inband signal detector, said encoder for forming an encoded signal, the encoded signal encoded responsive to the values of the inband signal, the encoded signal of the form to permit transmission of the indication of the inband signal to the receive station;

transmitter circuitry coupled to said encoder, said transmitter circuitry for generating and transmitting the send signal, the send signal representative of the encoded signal when the input signal is formed of the inband signal; and where in the general input signal is further selectably formed of an other-than-inband signal and wherein said transmitter circuitry is coupled to receive the general input signal when the general input signal is formed of the other-than-inband signal, said transmitter circuitry for generating and transmitting the send signal formed of the other-than-inband signal upon a traffic channel, the traffic channel defined in the digital communication system.

13. The apparatus of claim 12 wherein said transmitter circuitry is coupled to receive the encoded signal formed by said encoder when the general input signal is formed of the inband signal, said transmitter circuitry for generating and transmitting the send signal formed of the inband signal upon a non-traffic channel, the non-traffic channel defined in the digital communication system.

14. The apparatus of claim 13 wherein the receive station comprises decoding circuitry for decoding the send signal formed of the encoded signal transmitted by said transmitter upon the non-traffic channel and for recreating the send signal therefrom.

15. A fixed terminal operable in a digital cellular communication system, said fixed terminal comprising:

a wireline device, said wireline device for generating an input signal, the input signal at least selectively formed alternately of a DTMF (dual-tone, multi-frequency) signal and a non-DTMF signal;

a DTMF detector coupled to receive the input signal generated by said wireline device, said DTMF detector for detecting when the input signal is formed of the DTMF signal and for determining values of the DTMF signal when received thereat;

an encoder coupled to receive indications of the values of the DTMF signal detected by said DTMF detector, said encoder for forming an encoded signal, the encoded signal encoded responsive to the values of the DTMF signal, the encoded signal representative of the DTMF signal pursuant to the digital cellular communication system;

a digital cellular transceiver coupled at least to receive the non-DTMF signal when the input signal is formed of the non-DTMF signal and at least to receive the encoded signal when the input signal is formed of the DTMF signal, said digital cellular transceiver for transmitting the non-DTMF signal upon a traffic channel and for transmitting the encoded signal upon a non-traffic channel.

16. The fixed terminal of claim 15 wherein the wireline device comprises a POTS (plain old telephone service) telephonic device.

17. The fixed terminal of claim 16 further comprising a two-wire to four-wire converter connected to receive the input signal generated by the POTS telephonic device, said two-wire to four-wire converter for converting the input signal into a four-wire signal.

18. In a method for transmitting a send signal from a sending station to a receiving station in a digital communication system, the sending station coupled to receive a general input signal, the general input signal selectably formed of an inband signal, an improvement of a method for converting the inband signal into a form to permit transmission of an indication of the inband signal to the receive station, said method comprising the steps of:

delaying said input signal, including storing at least a segment of said input signal for a selected time period;

detecting when the input signal forms an inband signal;

determining values of the inband signal when the general input signal is detected during said step of detecting to be formed of the inband signal; and forming an encoded signal, the encoded signal encoded responsive to the values of the inband signal determined during said step of determining, the encoded signal of the form to permit transmission of the indication of the inband signal to the receive station.

19. In a method for transmitting a send signal from a sending station to a receiving station in a digital communication system, the sending station coupled to receive a general input signal, the general input signal selectably formed of an inband signal and further selectably formed of an other-than-inband signal, an improvement of a method for converting the inband signal into a form to permit transmission of an indication of the inband signal to the receive station, said method comprising the steps of:

- detecting whether the general input signal includes a selected inband signal, and if so, determining values of the inband signal and forming an encoded signal, the encoded signal encoded responsive to the values of the inband signal, the encoded signal of the form to permit transmission of the indication of the inband signal to the receive station;
- transmitting the send signal, the send signal representative of the encoded signal when the input signal is formed of the inband signal, and the send signal formed of the other-than-inband signal when the input signal is formed of the other-than-inband signal; and
- when the send signal is formed of the other-than-inband signal, said transmitting step including transmitting the send signal upon a traffic channel defined in the digital communication system.

20. In a method for transmitting a send signal from a sending station to a receiving station in a digital communication system, the sending station coupled to receive a general input signal, the general input signal selectably formed of an inband signal, an improvement of a method for converting the inband signal into a form to permit transmission of an indication of the inband signal to the receive station, said method comprising the steps of:

- detecting when the input signal forms an inband signal;
- determining values of the inband signal when the general input signal is detected during said step of detecting to be formed of the inband signal;
- forming an encoded signal, the encoded signal encoded responsive to the values of the inband signal determined during said step of determining, the encoded signal of the form to permit transmission of the indication of the inband signal to the receive station; and
- transmitting the encoded signal upon a non-traffic channel defined in the digital communication system.

21. The method of claim 20 comprising the further step of recreating the inband signal from the encoded signal transmitted upon the non-traffic channel, once received at the receive station.

* * * * *